(12) United States Patent
Galletta, Jr.

(10) Patent No.: US 7,531,097 B2
(45) Date of Patent: May 12, 2009

(54) METHOD AND APPARATUS FOR AERATION OF LIQUID MEDIUM

(76) Inventor: Robert J. Galletta, Jr., 603 Early St., Savannah, GA (US) 31405

( * ) Notice: Subject to any disclaimer, the term of this patent is extended or adjusted under 35 U.S.C. 154(b) by 0 days.

(21) Appl. No.: 12/187,905

(22) Filed: Aug. 7, 2008

(65) Prior Publication Data
US 2008/0290026 A1 Nov. 27, 2008

Related U.S. Application Data

(62) Division of application No. 11/131,113, filed on May 17, 2005, now Pat. No. 7,427,058.

(51) Int. Cl.
*B01F 3/04* (2006.01)

(52) U.S. Cl. .................... 210/758; 261/91; 261/92; 261/120

(58) Field of Classification Search ............ 261/83, 261/84, 91, 92, 120, DIG. 71; 210/749, 758
See application file for complete search history.

(56) References Cited

U.S. PATENT DOCUMENTS

| | | | | | |
|---|---|---|---|---|---|
| 345,408 | A | * | 7/1886 | Birge | 241/245 |
| 901,465 | A | * | 10/1908 | Pancoast | 366/288 |
| 3,322,410 | A | * | 5/1967 | Ahlenius | 261/92 |
| 3,997,443 | A | * | 12/1976 | Thissen | 210/150 |
| 4,493,557 | A | * | 1/1985 | Nayak et al. | 366/300 |
| 4,913,854 | A | * | 4/1990 | Miyahara | 261/92 |
| 5,116,501 | A | * | 5/1992 | House | 210/242.2 |
| 5,697,704 | A | * | 12/1997 | Coyle | 366/301 |
| 5,948,326 | A | * | 9/1999 | Pate | 261/91 |
| 6,499,727 | B1 | * | 12/2002 | Sylvester | 261/92 |
| 6,634,626 | B2 | * | 10/2003 | Petrescu et al. | 261/92 |
| 6,832,753 | B1 | * | 12/2004 | Huang | 261/28 |
| 7,427,058 | B2 | * | 9/2008 | Galletta, Jr. | 261/91 |

* cited by examiner

*Primary Examiner*—Scott Bushey
(74) *Attorney, Agent, or Firm*—Mathew L. Grell

(57) ABSTRACT

An apparatus and method for mixing gas and liquid including a dome, lower housing, aerator device and flotation device, wherein intermeshed rotating sets of discs operate on parallel shafts driven by variable speed drives, and strakes are radially mounted on the discs to carry liquid up into a mixing area and to carry air and liquid down into a mixing area resulting in a shear force that drives air into the oxygen depleted liquid. The dome and lower housing create an air tight space, wherein the barometric pressure is raised by a blower, in order to pop foam bubbles and allow for optimum mixing of air into the oxygen depleted liquid, and intake and discharge openings of the lower housing are positioned beneath the liquid line, thereby preventing the escape of foam, noise and odorous gases into the local environment.

18 Claims, 5 Drawing Sheets

US 7,531,097 B2

METHOD AND APPARATUS FOR AERATION OF LIQUID MEDIUM

CROSS-REFERENCE AND PRIORITY CLAIM TO RELATED APPLICATIONS

To the fullest extent permitted by law, the present divisional patent application cross-references and claims priority to and the full benefit of non-provisional patent application entitled "METHOD AND APPARATUS FOR AERATION OF LIQUID MEDIUM", filed on May 17, 2005, having assigned Ser. No. 11/131,113 now U.S. Pat. No. 7,427,058.

TECHNICAL FIELD

This invention relates to an apparatus and method for mixing gas, such as air, with liquid, and more particularly the invention relates to aeration of wastewater, sewage and industrial waste including any body of water or liquid.

BACKGROUND OF THE INVENTION

Wastewater from both municipal sewage systems and from industrial waste product exhausting systems is usually collected in large ponds, ditches, or basins that are referred to as wastewater ponds. Such ponds may be a few to several feet deep and may cover quite a number of acres of surface area. The wastewater usually includes large amounts of organic and inorganic waste material that, if left untreated, creates severe odors and can generates toxic products.

The most common method of wastewater treatment uses an activated sludge process. This process involves three major steps. The primary treatment stage consists of a simple separation between dense sludge, which is sent to an incinerator or land fill, and the remaining effluent liquid sludge which then undergoes secondary treatment. Secondary treatment is where the biochemical consumption of organic material takes place. The microorganisms present in the liquid sludge feast on the biomass in the wastewater pond. Extensive aeration is needed for the bacteria to consume the organic wastes.

The third phase of treatment can be simple or extensive depending upon the extent of pollution and the requirements for water purity. Its purpose is to remove inorganic pollutants as well as any organic mass not removed by the primary and secondary stages. Lastly, the treated water is discharged back into the environment. This discharge must meet federal, state, county and city government standards for discharged water, such as minimum dissolved oxygen levels deemed necessary to accommodate marine life, before such wastewater can be discharged into a river or stream.

The activated sludge process is a biochemical process in which aerobic bacteria consume the organic pollutants in wastewater. Because the bacteria are aerobic, their efficiency of consumption is very dependent upon the amount of available oxygen dissolved in the liquid sludge. In the wastewater treatment process, aeration introduces air into a liquid, providing an aerobic environment for microbial degradation of organic matter. The purpose of aeration is two-fold: to supply the required oxygen to the metabolizing microorganisms and to provide mixing so that the microorganisms come into intimate contact with the dissolved and suspended organic matter.

Various aeration approaches have been used; the two most common aeration systems are subsurface and mechanical. In subsurface aeration systems, air or oxygen is pumped below the surface to a diffuser or other device submerged in the wastewater. Fine pore diffusion is a subsurface form of aeration in which air is introduced in the form of very small bubbles into the wastewater pond. One type of an oxygen diffuser for wastewater treatment process requires constant movement of the diffuser to different levels and positions within the wastewater pond and performs minimal mixing of the wastewater and microorganisms. In addition, un-reacted air or oxygen bubbles remaining that make their way to the surface. If oxygen is the source, then the oxygen that makes it to the surface of the wastewater pond is wasted as it vents to the air above the pond.

Mechanical aeration and mixing systems take on various forms, such as downdraft pumps, which force surface water to the bottom, updraft pumps, which produce a small fountain, and paddle wheels, which increase the surface area of the water. In addition, all such devices mix wastewater by moving large amounts of heavy water or hurling it into the air resulting in high energy consumption for these devices. Some such devices generate large amounts of odor and foam while agitating the wastewater and consume large amounts of electrical power resulting in high electricity cost for operation.

Therefore, it is readily apparent that there is a need for an economical apparatus and method for aeration of wastewater, sewage and industrial waste, and more particularly, a process for efficiently adding dissolved oxygen into wastewater, sewage and industrial waste while minimizing odor, foam and energy consumption.

BRIEF SUMMARY OF THE INVENTION

Briefly described, in the preferred embodiment, the present invention overcomes the above-mentioned disadvantages and meets the recognized need for such a device by providing a method and apparatus for mixing gas, such as air, with liquid, such as wastewater, sewage and industrial waste in a wastewater pond.

According to its major aspects and broadly stated, the present invention in its preferred form is a floating pressurized dome aerator device and process for adding dissolved oxygen into wastewater, sewage and industrial waste.

More specifically, the preferred aerator device present invention has two or more partially submerged interleaved sets of discs operating in rotational unison along parallel shafts driven by variable speed drives. One or more strakes with end caps are mounted on the discs in radial fashion, extending from the hub to the edge of the disc. The strakes on one disc bring the liquid up to the wastewater line and the strakes on the other disc bring the air down to the wastewater line and in close contact with each other in a mixing area just below the wastewater line. This force mixes the oxygen from the air into the oxygen-depleted water, thus increasing the dissolved oxygen content of the wastewater.

Accordingly, a feature and advantage of the present invention is its ability to create a shear force between the liquid on the leading edge of opposing strakes within the mixing area to efficiently mix the air and wastewater.

In addition, the strakes have bleed holes on their trailing face. The end caps force wastewater fluid eddy on the liquid side and flurries of bubbles of air on the gas side through the bleed holes of the trailing edge of the strake into the mixing area to efficiently mix the air and wastewater.

Accordingly, a feature and advantage of the present invention is its ability to sustain a larger number of aerobic dependent bacteria than traditional methods resulting in an increased biochemical consumption of organic material in the wastewater pond.

In use, the aerator device is placed on a floating platform to keep the aerator device at a set position relative to the water line. The floating apparatus is covered with an airtight cover or dome, wherein the barometric pressure is raised under the cover or dome by an air blower to create an atmosphere under the dome with an increased barometric pressure.

Another feature and advantage of the present invention is that the variable barometric pressure allows for optimum atmospheric dissolution under the cover or dome.

Another feature and advantage of the present invention is that the foam must travel back beneath the water line of the liquid to escape the floating apparatus resulting in further aeration of the liquid sludge.

Another feature and advantage of the present invention is that the liquid inlet is beneath the waterline creating a sealed environment.

Another feature and advantage of the present invention is that the liquid discharge is beneath the waterline creating a sealed environment.

Another feature and advantage of the present invention is its ability to minimize foam generated during use, wherein the raised barometric pressure in the dome serves the function of popping the bubbles created by the mechanical mixer.

Another feature and advantage of the present invention is that the cover or dome traps odorous gases preventing their escape into the local environment, resulting in an odor free operation.

Another feature and advantage of the present invention is that the cover or dome traps the noises generated by the mechanical agitation preventing their escape into the local environment and resulting in an essentially noise free operation.

These and other features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

In describing the preferred and alternate embodiments of the present invention, as illustrated in FIGS. 1-5, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-5, the present invention in its preferred embodiment is a floating pressurized dome aerator device and process for adding dissolved oxygen into wastewater, sewage and or industrial waste. It is important to understand that the present invention is suitable for utilization in any liquid environment where an increase in dissolved air or gas into liquid medium is desired or beneficial; therefore, while the apparatus and method of the present invention is described conveniently with the preferred utilization in a wastewater pond, it is not limited to application or implementation in such wastewater pond. Furthermore, the present invention may be utilized in water such as but not limited to a golf course pond, water with aquatic plants, as well as water with fish and/or other marine life. The apparatus and method of the present invention is suitable for many applications where air or other gas is to be dissolved into a liquid medium, including but not limited to golf course ponds, oxygen depleted lakes, streams, and rivers as well as environmental and/or industrial processes.

Figure 1:
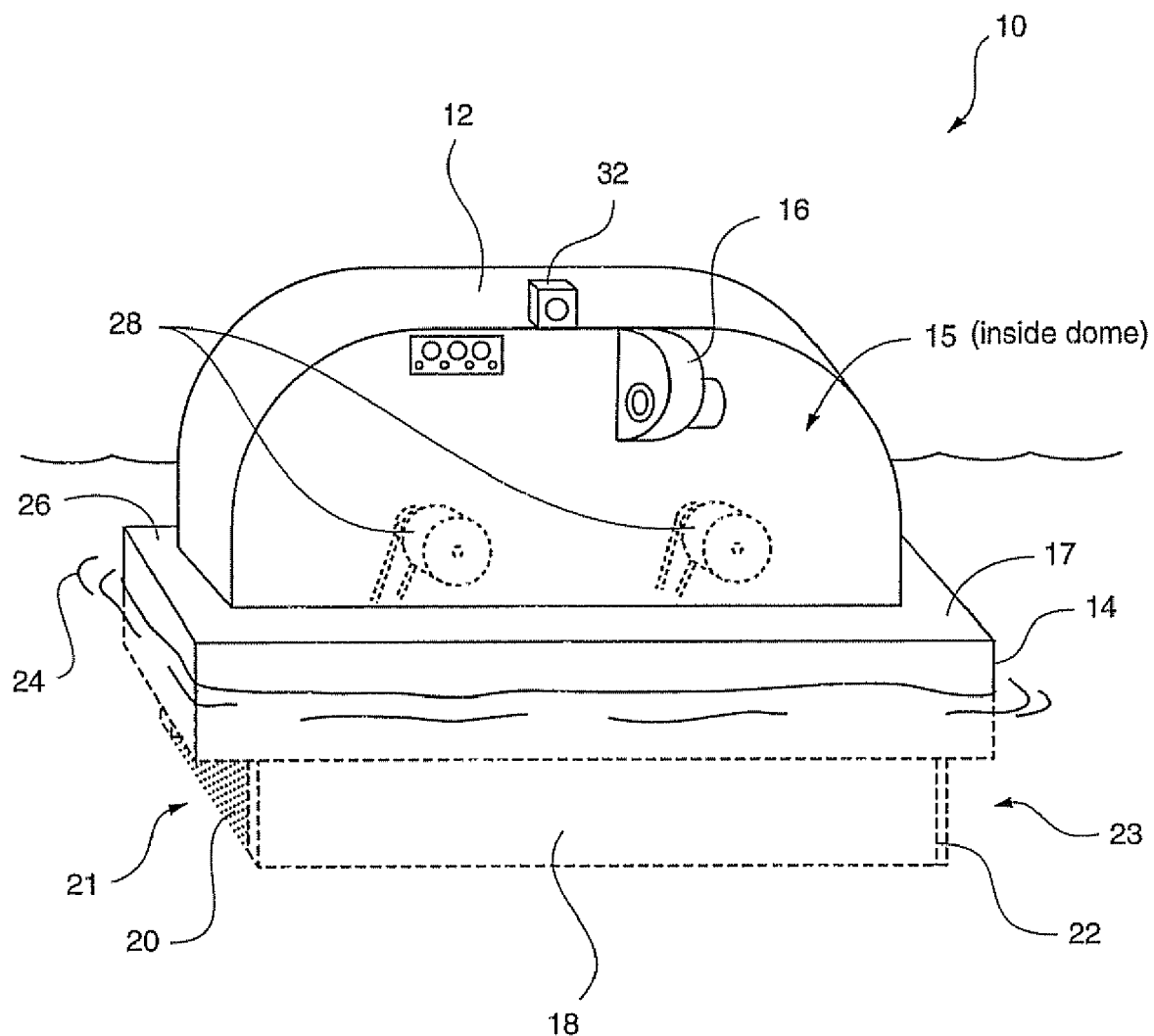
FIG. 1 is a cross-sectional illustration of the aeration apparatus according to the preferred embodiment of the present invention.

Referring now to FIG. 1, there is illustrated a preferred fully enclosed floating dome aerator device 10. Aerator device 10 is a mechanical gas dissolving apparatus operating in a controlled pressurized environment. Dome 12 is preferably supported by flotation device 14 proximate waterline 24 of a pond or wastewater, sewage, industrial waste pond or other selected liquid treatment reservoir. Dome 12 includes top portion 13 preferably positioned above the surface of the pond, so as to define a space or compartmental enclosure 15 for containing mechanical aggitation of aerator device 10. Dome 12 is preferably constructed of an airtight and corrosion resistant material such as fiberglass or metal. It is recognized that other suitable materials could be utilized without departing from the intended scope of the present invention. That is, dome 12 may be constructed of any material capable of holding the area defined by space or compartmental enclosure 15 under the dome at a selected, preferably increased barometric pressure.

Compartmental enclosure defined by dome 12 creates a space above the waterline 22 that can collect foam and odor generated by aerator device 10. Foam generated by aerator device 10 is thus held in close proximity to aerator device 10 and must travel back beneath waterline 24 to escape, further enhancing the transfer of gas to the liquid. Odorous gases generated by the mechanical agitation of aerator device 10 are also trapped in dome 12 preventing their escape into the surrounding environment resulting in an essentially odor free operation. In addition, dome 12 acts as a sound barrier, trapping the noises generated by the mechanical agitation of aerator device 10, preventing their escape into the surrounding environment, and thereby resulting in an essentially noiseless operation.

Blower 16 is preferably any common industrial variable speed rotary type blower. Blower 16 can be of any standard design with air flow and pressure ratings capable of increasing the barometric pressure of the air under dome 12 to preferably between approximately 35-40 inches of mercury or 1-3 psi, however, greater barometric pressure can be utilized depending on the gas and liquid medium being mixed. Blower 16 is preferably rotary, but can be any fan, centrifugal, rotary or any other type of blower or air source. Blower 16 is preferably a single unit positioned proximate top portion 13; however, blower 16 can be in the form of a single or multiple blowers and can be located anywhere on aerator device 10 that permits air flow access to interior space 15 under dome 12. In the preferred operation, blower 16 increases the barometric pressure under dome 12 creating an ideal environment for the transfer of gas to the liquid under dome 12, wherein coincidentally surface area is increased via agitation and whirling of liquid by aerator device 10. In addition, the increase in barometric pressure under dome 12 assists with popping the foam bubbles, effectively reducing the foam generated by aerator device 10.

Blower 16 can preferably be used for facilitating fine adjustment of the position of the mechanical agitators of aerator device 10 relative to the pond level 24. That is, because barometric pressure inside dome 12 increases when blower 16 is in operation, this causes the liquid level under the dome 12 to be slightly lower than the static level of the pond.

Floatation device 14 is preferably a pontoon; however, flotation device 14 can be made of any material and define any shape capable of keeping aerator device 10 afloat. Floatation device 14 is preferably attached to a submerged or floating frame 46 (not shown) for support and positioning of dome 12, lower housing 18, and other components of aerator device 10. Flotation device 14 preferably includes a ballast (not shown) to allow for user-controlled or controller controlled height adjustment of aerator device 10 in relation to waterline 24. Such ballast allows the operator or controller to adjust the position of aerator device 10 relative to the static pond level, the specific gravity of the liquid, or the barometric pressure under dome 12. Flotation device 14 preferably includes maintenance deck 26 on top side 17 of flotation device 14, wherein maintenance deck 26 preferably extends outwardly along the circumference of dome 12.

Lower housing 18 preferably defines a partially submerged conduit having closed sides and bottom (not shown), thereby forming a submerged channel with an open top (not shown) and opposing open sides 21 and 23. Lower housing 18 is preferably attached to frame system 46 (not shown). Lower housing 18 is preferably made of a watertight and corrosion resistant material, however, lower housing 18 can be constructed of any material capable of directing the inflow and outflow of liquid through a designated passageway. Open end 21, referenced as the intake 21, preferably has intake screen 20 to prevent debris, marine life, and large particulates from entering aerator device 10. In addition, open end 23 referenced as the discharge 23, preferably has discharge screen 22 to prevent debris, marine life, and large particulates from entering aerator device 10. Such screening enables positioning of intake 21 and discharge 23 of lower housing 18 preferably submerged below the liquid line thereby creating a sealed environment and minimizing the noise, foam and odor escaping from aerator device 10.

Figure 2:
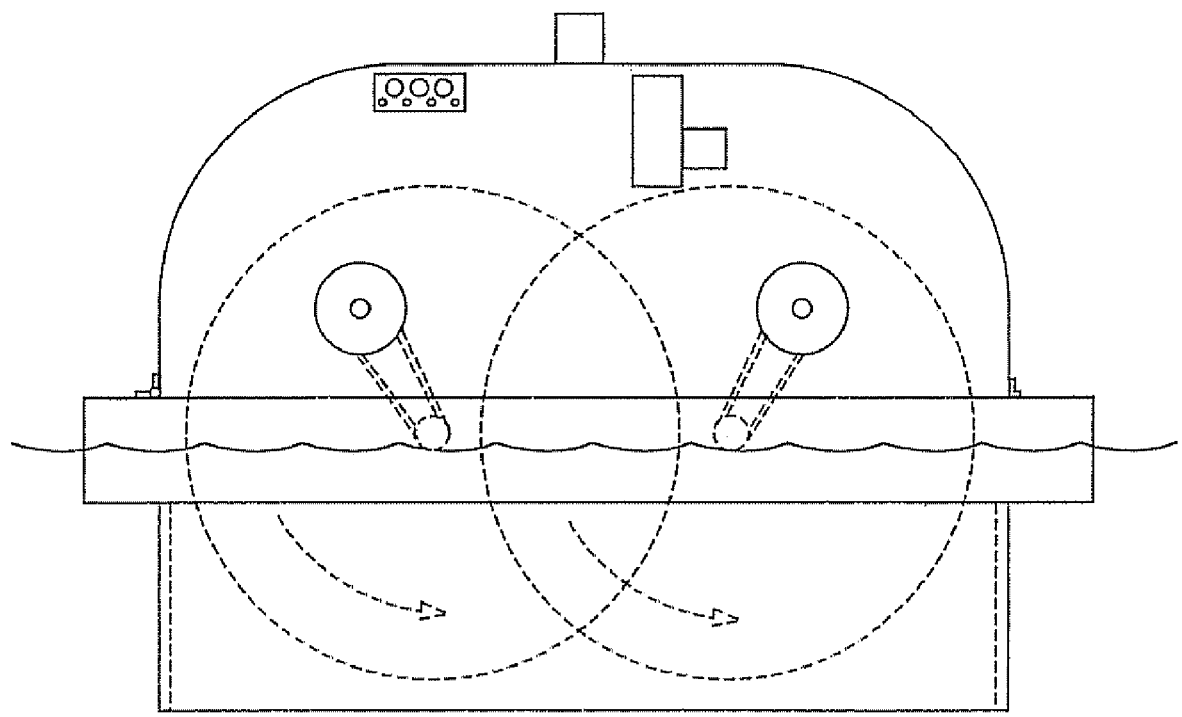
FIG. 2 is a front sectional view of the aeration apparatus of FIG. 1.

Dome 12 is preferably affixed to lower housing 18, preferably via a corrosion resistant hinge 48 and latch 50 assembly (shown in FIG. 2). Although hinge 48 and latch 50 are preferred, any appropriate affixing means of any standard mechanism can be utilized, including but not limited to nut and bolt, latch, lock, catch and/or clasp as long as the configuration is capable of holding dome 12 in contact with lower housing 18.

Drive 28 is preferably a variable speed AC or DC drive, including but not limited to any gear reduction, belt, chain, or shaft driven. Drive 28 can be any standard design with horse power, variable rotational speed, and directional ratings capable of rotating the mechanical agitation of aerator device 10. Drive 28 is preferably fixed to frame 46 of flotation device 14. Struts or brace members (not shown) preferably provide a generally rigid support for frame 46 and functions as a mounting plate for drive 28. Power sources capable of operating drive 28 and/or aerator device 10 include but are not limited to alternating current, direct current, compressed air and or solar power.

Controller 30 is preferably a multichannel digital motor control. Controller 30 can be any standard drive controller that matches drive 28. Controller 30 may include other features such as a blower controller that monitors the pressure under dome 12 and regulates blower 16 to maintain a specified pressure under dome 12. Controller 30 may also include a scheduler to preset hourly, night and day, daily, weekly, monthly seasonal and/or other runtime schedules for aerator device 10. Controller 30 may also include inputs from environmental sensors (not shown), including but not limited to wastewater temperature, dissolved oxygen content of the wastewater, and/or air temperature wherein each sensor reading is preferably collected and available from inside and/or outside aerator device 10, in addition to a light sensor to determine and record whether the measurement is collected during night or day. With these inputs, controller 30 is able to maximize the efficiency of the transfer rate of gas to liquid by modifying the operation of aerator device 10 based on essentially real-time inputs from environmental sensors, wherein energy consumption is also minimized. Controller 30 is preferably positioned proximate top portion 13; however, controller 30 can be placed anywhere on aerator device 10 that is accessible by an operator from maintenance deck 26 on top side 17 of flotation device 14. Controller 30 can be remotely controlled by a wireless radio frequency, infrared signal, or any other suitable transmission and receive source, thereby enabling aerator device 10 to be programmed or operated from a remote location.

As illustrated in FIG. 1, aerator device 10 preferably has lifting eye 32 suitably fixed to frame 46 of flotation device 14. Lifting eye 32, together with frame 46 of flotation device 14, preferably enables aerator device 10 to be lifted in and out of a wastewater pond via a hoist or crane. Lifting eye 32 can be in the form of a single or multiple lifting eyes and can be located anywhere on aerator device 10 suitable for attachment to frame 46 of flotation device 14.

Referring now to FIG. 2, there is illustrated a front cross-sectional view of floating dome aerator device 10 with preferred placement of the internal mechanics of aerator device 10 shown. Two drives 42 and 44 are preferred and shown for aerator device 10, a leading drive 42 and a trailing drive 44. Leading drive 42 and trailing drive 44 preferably rotationally operate in the same direction and at the same speed; however, drives 42 and 44 are preferably capable of operating at different speeds. For example, trailing drive 44 could operate at 2× the speed of leading drive 42.

Both leading drive 42 and trailing drive 44 are preferably attached to frame 46. Frame system 46 is preferably made of a light weight and corrosion resistant material, including but not limited to tubing, cables, and/or angled iron or aluminum, or combinations of the same or any other suitable material. Frame 46 can be constructed of any material capable of supporting and positioning leading drive 42, trailing drive 44, dome 12, lower housing 18, flotation device 14, and the other system components of aerator device 10. Lifting eye 32 is securely affixed to frame system 46.

Vane 54 is a variable flow control device that can be mounted on intake 21 or discharge 23 of lower housing 18. Vane 54 is preferably made of a corrosion resistant material. A plurality of vanes 54 preferably enable control of the flow of liquid into and out of lower housing 18, thereby maximizing the transfer of gas to the liquid. The positioning of plurality of vane 54 can preferably be set by an operator or controlled by controller 30.

Figure 4A:
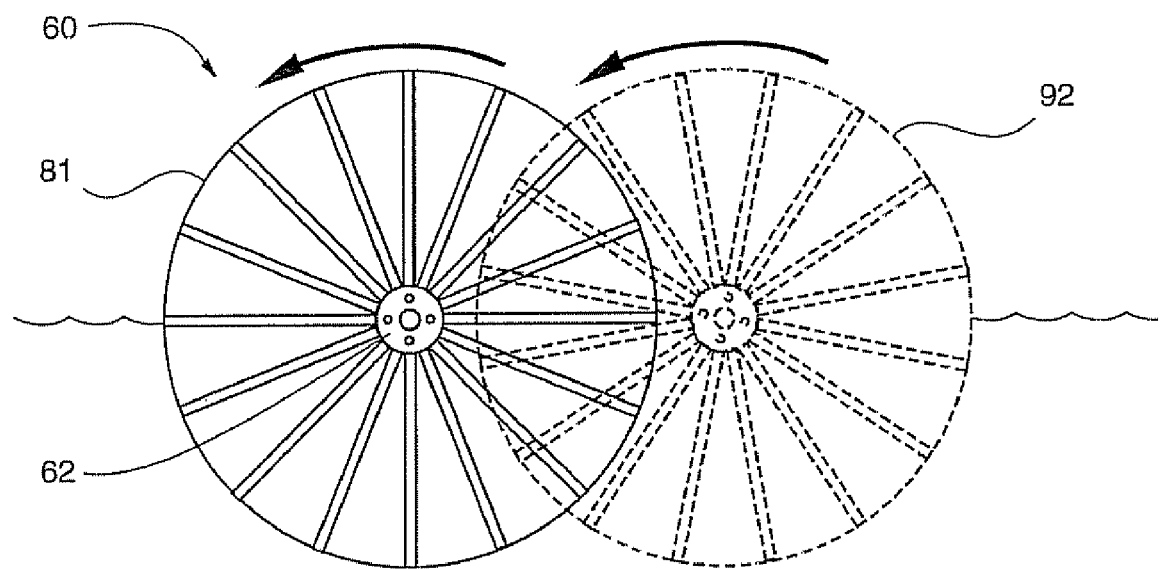
FIG. 4A is front sectional view of a pair of discs showing their direction of rotation according to the invention.

Referring now to FIG. 4A, a front view of a preferred disc 60 is shown. Disc 60 is preferably a thin flat disc made of corrosion resistant material. Disc 60 can be constructed of any material, configuration and/or dimension capable of being rotated through the sludge of wastewater. Possible shapes and configurations include, without limitation, a star, square, hexagon, octagon, and any other configurations capable of defining a mixing area and a shear force zone within a liquid medium. Disc 60 preferably has keyed hub 62 at its center for affixing disc 60 to shaft 45 (shown in FIG. 4B). Although keyed hub 62 is preferred, any suitable affixing means could be utilized of any standard design with a means to attach disc 60 to a shaft 45. The preferred keyed hub 62 allows for disc spacing and adjustment on shaft 45, thereby maintaining proper spacing.

Figure 3:
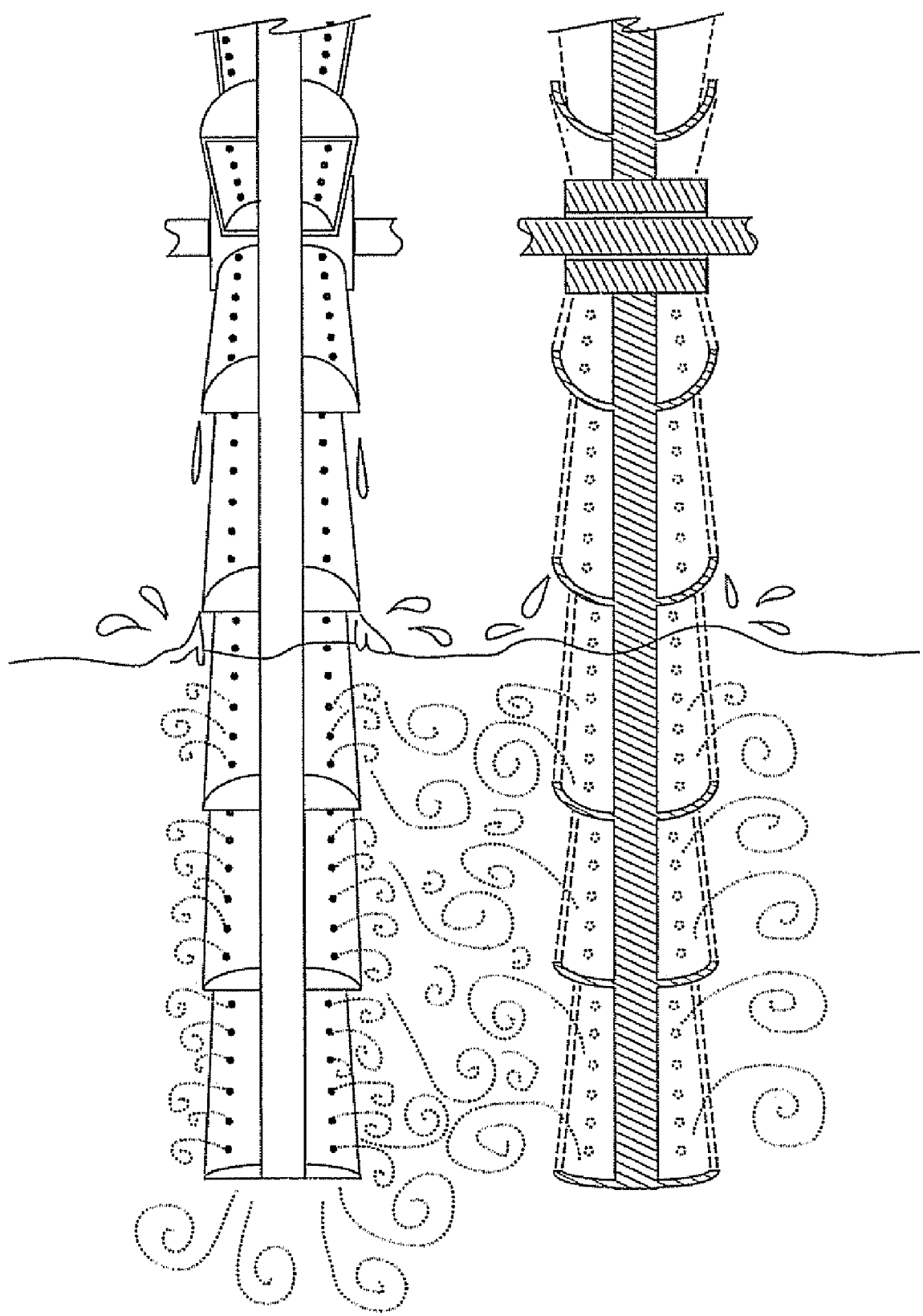
FIG. 3 is perspective view of a strake with bleed holes according to the invention.

Referring now to FIG. 3, a perspective view of preferred strake 70 is shown. Strake 70 is preferably made of a watertight and corrosion resistant material; however, strake 70 can be constructed of any material capable of carrying liquid and/or gas. Strake 70 preferably has quarter circle, unshaped or generally triangular shaped end cap 72, open leading face 74, trailing face 75 and mounting face 76, wherein faces 74, 75, 76 preferably extend lengthwise along strake 70 forming peripheral edges of a channel for strake 70 to carry liquid and/or gas. Additionally, strake 70 preferably has a plurality of bleed holes 78 defined through trailing face 75.

Strake 70 can be varied in size, shape, angle, and bleed hole placement to maximize aerator device 10 dissolved gas transfer rate in any liquid medium. For example, a smaller strake moving at a higher speed may be more effective on wastewater with high solids content, whereas a large strake at lower speeds may be more effective on wastewater with smaller solids and also may be less disturbing to marine life. Furthermore, strake 70 can be varied in size, shape, angle, and bleed hole placement to account for the centrifugal force on the liquid. A plurality of strakes 70 are preferably secured to both sides of disc 60 in a radial configuration with each open face 74 oriented in same direction. Each strake 70 is arranged in a radial configuration beginning at the center of disc 60 and extending outward to the outer circumference edge or peripheral edge of disc 60, wherein flat face 76 of strake 70 is preferably affixed to disc 60, preferably via corrosion resistant bolt and nut (not shown). Although corrosion resistant bolt and nut are preferred, the affixing means can of any standard mechanism, and may be selected dependent on the material used for disc 60 and strake 70, including but not limited to welding, adhesive, or epoxy. The illustration shown in FIG. 3 is not a specification or limitation on the number of strakes 70 affixed to disc 60.

Figure 5:
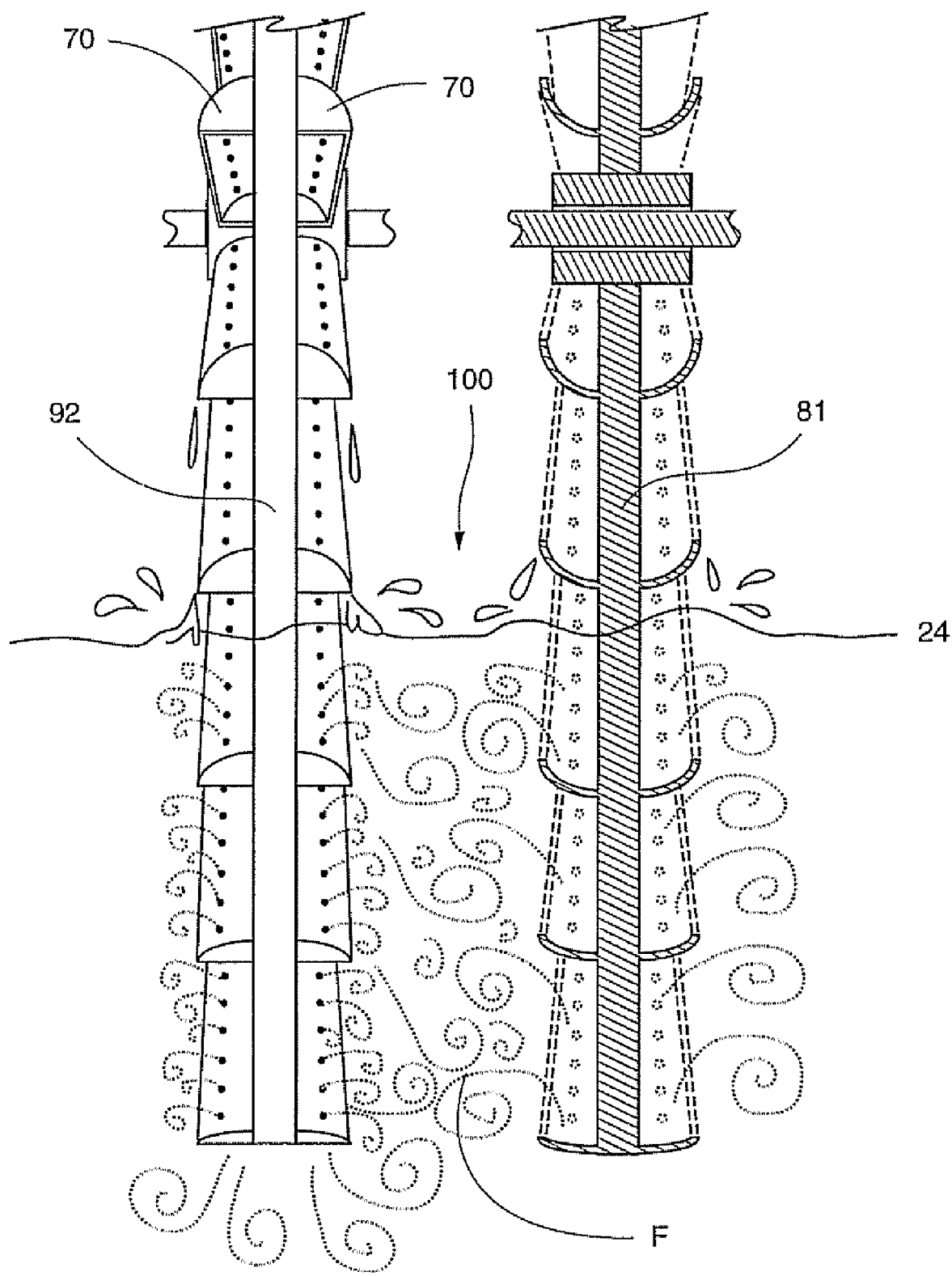
FIG. 5 is an enlarged partial sectional view depicting the dynamics of the liquid gas mixing area, showing radial strakes and bleed holes according to the preferred embodiment of the present invention.

Referring now to FIG. 4A, a front sectional view of a pair of preferred discs 60 is shown, depicting the preferred arrangement, area of overlap, and direction of rotation. Leading disc 81 and trailing disc 92 are preferably arranged so they overlap as discussed below. Both disc assemblies are preferably partially submerged in a liquid medium, preferably at a depth of at least 40% of their diameter; however, both disc assemblies can be submerged in a liquid medium to any depth, wherein at least part of the disc assemblies are exposed to the atmosphere under dome 12. Mixing area 100 is created below liquid line 24 between where the leading disc 81 and trailing disc 92 overlap as also depicted in FIG. 5. The plurality of strakes 70 on leading disc 81 capture liquid from the wastewater pond and carry it up into mixing area 100. Plurality of strakes 70 on trailing disc 92 preferably capture air underneath dome 12 and carry it down into mixing area 100.

As depicted in FIG. 4A, when strake 70 is rotated up out of the liquid, it carries liquid up and out of the wastewater pond. This carried liquid escapes through bleed holes 78, thereby creating additional liquid surface area which comes into contact with air, thereby resulting in an additional transfer of gas to the liquid. When strake 70 is rotated down into the liquid, it carries air down into the wastewater pond. The air escapes through a plurality bleed holes 78, thereby creating additional submerged air which comes into contact with liquid, resulting in additional transfer of gas to the liquid.

Figure 4B:
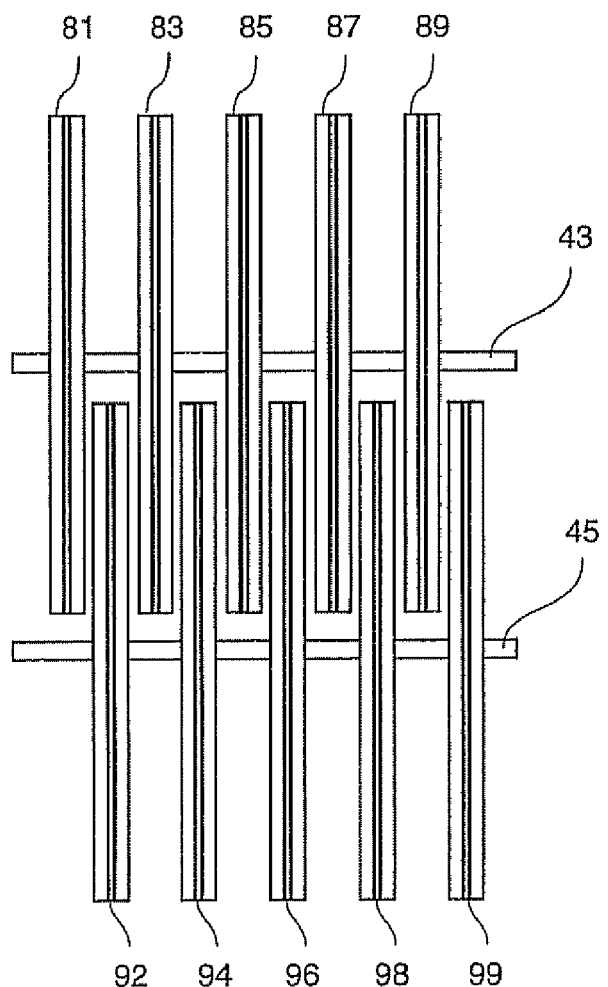
FIG. 4B is a top sectional view of disc array showing two sets of discs interleaved amongst each other according to the invention.

Referring now to FIG. 4B, a top sectional view of two sets of plurality of discs 60 intermeshed amongst each other are shown. Leading drive 42 is connected to leading shaft 43 and one or more disc 60 (shown as leading disc assemblies 81, 83, 85, and 87) are preferably affixed to leading shaft 43. Trailing drive 44 is connected to trailing shaft 45 and one or more disc 60 (shown as trailing disc assemblies 92, 94, 96, 98, and 99) are preferably affixed to trailing shaft 45. The illustration shown in FIG. 4B is not a specification or limitation on the number of discs 60 in either array of discs or the number of shafts or the number of drives. These variable parameters are determined by the dissolved gas requirements and other application requirements of the liquid being treated. The leading and trailing disc assemblies are placed in parallel, with their properly spaced discs placed in an overlapping, interlaced relation. Spacing between the discs 60 is preferably accomplished using keyed hub 62; however, spacers (not shown) can be used. Preferably, the overlap between leading and trailing disc assemblies is 45% of the diameter of disc 60; however, the amount of overlap between the two sets of discs may be adjusted by varying the parallel spacing of leading shaft 43 and trailing shaft 45 provided the distance is less than the disc 70 radius.

Referring now to FIG. 5, an enlarged partial sectional view of aerator device 10 is shown, to facilitate explanation of the dynamics of mixing area 100. Strakes 70 on leading disc 81 captures liquid from the wastewater pond and carries it up into the mixing area 100. Strakes 70 on trailing disc 92 captures air from underneath dome 12 and carries it down into mixing area 100, in addition to pushing liquid down into mixing area 100. Discs 81 and 92 and their two strakes 70 moving in unison together create shear force F between the upward and downward moving liquid within the mixing area, resulting in shear force F that drives air into the oxygen depleted wastewater. Shearing force F occurs in oxygen rich mixing area 100 resulting in an increased transfer of oxygen into the wastewater.

Referring now to FIG. 5, an enlarged partial sectional view of aerator device 10 is shown, to facilitate further explanation of additional dynamics of liquid gas mixing area 100. Strakes 70 on the leading disc 81 captures liquid from the wastewater pond and carries it up into mixing area 100. Plurality of bleed holes 78 in trailing face 75 of strake 70 on leading disc 81 will leak liquid into mixing area 100 as fluid eddies. Strake 70 on the trailing disc 92 captures air from underneath dome 12 and carries it down into mixing area 100. Plurality of bleed holes 78 in trailing face 75 of the strakes on trailing disc 90 leak flurries of air bubbles into mixing area 100. The flurry of air bubbles and fluid eddies combine in mixing area 100, thereby creating an increased transfer of oxygen into the wastewater.

The disc assemblies can be set in motion rotating in unison, or, the individual drive speeds can be utilized, thereby allowing for essentially infinite combinations of liquid and air, shearing forces, liquid eddies, and/or flurries of bubbles, thus allowing for optimum transfer of oxygen into the wastewater.

It is contemplated in an alternate embodiment that aerator device 10 is suitable for utilization and adaptable without flotation device 14 for use in a pipe, such as a discharge pipe. Furthermore, it is contemplated in an alternate embodiment that aerator device 10 is adaptable without lower housing 18 for use in a pipe, such as a discharge pipe. Aerator device 10 is preferably mechanically affixed and positioned inside the pipe. Preferably, the flow rate of the liquid in the pipe is adjusted to maintain the liquid level where both disc assemblies are preferably partially submerged in a liquid medium, preferably at a depth of at least 40% of their diameter; however, both disc assemblies can be submerged in a liquid medium to any depth, wherein at least part of the disc assemblies are exposed to the atmosphere under dome 12.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A method of mixing liquid, comprising the steps of:
   a) obtaining an apparatus comprising a dome, leading disc, trailing disc, and at least two strakes, wherein said first strake is carried by said leading disc and said second strake is carried by said trailing disc,
   b) trapping liquid between said discs in a mixing area,
   c) forcing liquid up into said mixing area by said first strake, and
   d) forcing liquid down into said mixing area by said second strake.

2. The method of claim 1, wherein said dome is floating.

3. The method of claim 1, further comprising a shearing means in said mixing area, said shearing means comprising a first liquid force from said first strake on said leading disc and a second liquid force from said second strake on said trailing disc.

4. The method of claim 1, wherein said mixing area is defined as an area below a liquid line and between said discs, wherein said leading disc and said trailing disc overlap.

5. The method of claim 1, performed under a sealed dome.

6. The method of claim 3, performed under a pressurized dome.

7. The method of claim 5, wherein said sealed dome traps odorous gas.

8. The method of claim 5, wherein said sealed dome traps noise.

9. The method of claim 5, wherein said sealed dome traps foam.

10. The method of claim 1, performed in a pipe.

11. A method of mixing liquid, comprising the steps of:
    a) obtaining an apparatus comprising a dome, leading disc, trailing disc, and at least two strakes, wherein said first strake is carried by said leading disc and said second strake is carried by said trailing disc,
    b) trapping liquid between said discs in a mixing area,
    c) forcing liquid up into said mixing area by said first strake, and
    d) forcing air down into said mixing area by said second strake.

12. The method of claim 11, wherein said dome is floating.

13. The method of claim 11, wherein said strake comprises a bleed hole.

14. The method of claim 13, further comprising a mixing means in said mixing area, said mixing means comprising at least one eddy of liquid from said bleed hole in said strake on said leading disc and at least one bubble from said bleed hole on said strake on said trailing disc.

15. The method of claim 11, wherein said mixing area is defined as an area below a liquid line and between said discs, wherein said leading disc and said trailing disc overlap.

16. The method of claim 11, performed under a sealed dome.

17. The method of claim 11, performed under a pressurized dome.

18. The method of claim 11, performed in a pipe.

* * * * *